(12) United States Patent
Vanderhoff

(10) Patent No.: US 9,230,188 B2
(45) Date of Patent: Jan. 5, 2016

(54) OBJECTIVE METRIC RELATING TO PERCEPTUAL COLOR DIFFERENCES BETWEEN IMAGES

(71) Applicant: Verizon Patent and Licensing Inc., Arlington, VA (US)

(72) Inventor: Earl W. Vanderhoff, Cranston, RI (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 117 days.

(21) Appl. No.: 14/231,121

(22) Filed: Mar. 31, 2014

(65) Prior Publication Data

US 2015/0278629 A1 Oct. 1, 2015

(51) Int. Cl.
*G06K 9/00* (2006.01)
*G06K 9/46* (2006.01)
*G06T 7/40* (2006.01)
*G06K 9/62* (2006.01)

(52) U.S. Cl.
CPC ............ *G06K 9/4652* (2013.01); *G06K 9/4609* (2013.01); *G06K 9/4642* (2013.01); *G06K 9/4661* (2013.01); *G06K 9/6215* (2013.01); *G06T 7/408* (2013.01)

(58) Field of Classification Search
CPC combination set(s) only.
See application file for complete search history.

(56) References Cited

U.S. PATENT DOCUMENTS

2011/0044538 A1 * 2/2011 Vanderhoff ........ G06K 9/00744
382/165

* cited by examiner

*Primary Examiner* — Duy M Dang

(57) ABSTRACT

Techniques described herein may determine an objective metric that relates to the color difference that may be perceived by humans viewing two images of the same visual scene. In one implementation, a method may include receiving first and second images; determining a first histogram based on hue values associated with pixels in the first image; and determining a second histogram based on hue values associated with pixels in the second image. A color difference metric may be determined based on a comparison between the first and second histograms. The color difference metric may relate to an objective measure of color differences between the first and second images.

20 Claims, 11 Drawing Sheets

OBJECTIVE METRIC RELATING TO PERCEPTUAL COLOR DIFFERENCES BETWEEN IMAGES

BACKGROUND

A color model is a model describing the way colors can be represented as sets of numbers. Examples of color models include the RGB color model. The RGB color model is an additive color model that models the addition of red, green, and blue light to reproduce colors. Other examples of color models are the HSL and HSB (also called HSV) color models. The HSL and HSB models relate to cylindrical-coordinate representations of points in the RGB color model. In an HSL/HSB cylinder, the angle around the central vertical axis corresponds to the "hue" (H), the distance from the axis corresponds to the "saturation" (S), and the distance along the axis corresponds to the coordinate with which the model attempts to represent perceived luminance in relation to the saturation (the "lightness" (L) or "brightness" (B)).

DETAILED DESCRIPTION OF PREFERRED EMBODIMENTS

The following detailed description refers to the accompanying drawings. The same reference numbers in different drawings may identify the same or similar elements.

Techniques described herein may determine an objective metric that relates to the color difference that may be perceived by humans viewing two images of the same visual scene. For example, an image may be encoded using two different encodings (e.g., the images may be encoded to have different resolutions). A human viewing the images may perceive color differences between the images. With the techniques described herein, the two images may be analyzed to obtain an objective metric (called a "color difference metric" herein), such as a single scalar value, that relates to the perceived color differences. In one implementation, the color difference metric may be expressed as a percentage value (e.g., between zero and 100 percent), in which larger values indicate that a human is likely to perceive a greater difference in the coloration of the two images.

The color difference metric may be used in a variety of applications. For example, a video may be encoded using two different encodings (e.g., high and low resolution encodings). Corresponding images in the encoded videos may be sampled and compared based on the color difference metric. Values above a threshold may trigger review by a technician. As another example, displays produced by a manufacturer may be tested for uniformity by capturing an image of the display operating to display a test image. Images displayed by different displays may be captured using a camera in a controlled image capture environment (e.g., the same lighting may be used). The color difference metric may be calculated for each captured image, relative to a reference image, to determine whether a particular display produces an unacceptable amount of color variation. The color difference metric described herein may be used in other applications, some of which will be described in more detail below.

Figure 1:
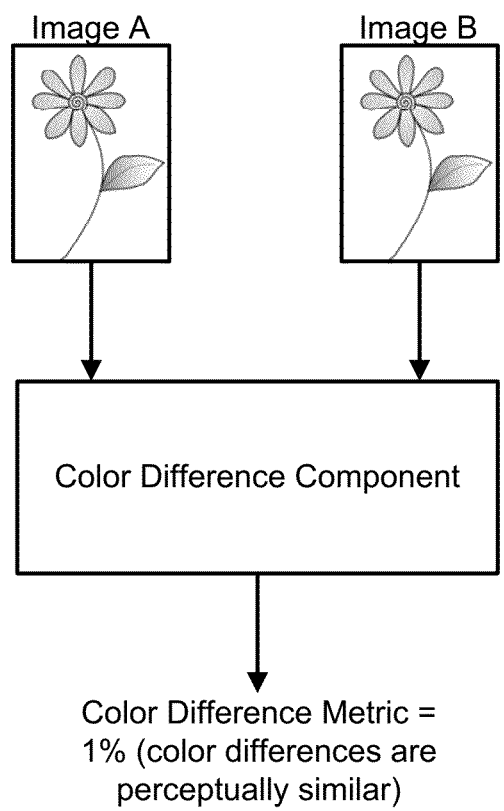
FIG. 1 is a diagram illustrating an example of an overview of concepts described herein.

FIG. 1 is a diagram illustrating an example of an overview of concepts described herein. Assume it may be desirable to determine the value of the color difference metric for the two images labeled as "Image A" and "Image B." The images may correspond to, for example, corresponding images (e.g., at the same time point) from corresponding video files that were recorded using different encodings. The two images may be input to a color difference component, which may generally operate to convert each image to a histogram of cumulative modified hue intensities, in which each modified hue intensity relates to a hue value (e.g., from the HSB color model) that is scaled by one or more scaling factors that are determined based on corresponding saturation and brightness values. The color difference component may obtain the color difference metric, for the two images, by comparing differences in the histograms. In one implementation, the centers of gravity may be calculated for the histograms. The color difference metric may be calculated based on a comparison of the centers of gravity. The operation of the color difference component will be described in more detail below.

In the example of FIG. 1, the color difference metric is illustrated as having the value of 1%. This may indicate that "Image A" and "Image B" are perceptually close to one another from a color perspective. For example, a human viewing "Image A" and "Image B" may not perceive notable differences in the coloration between the two images.

Figure 2:
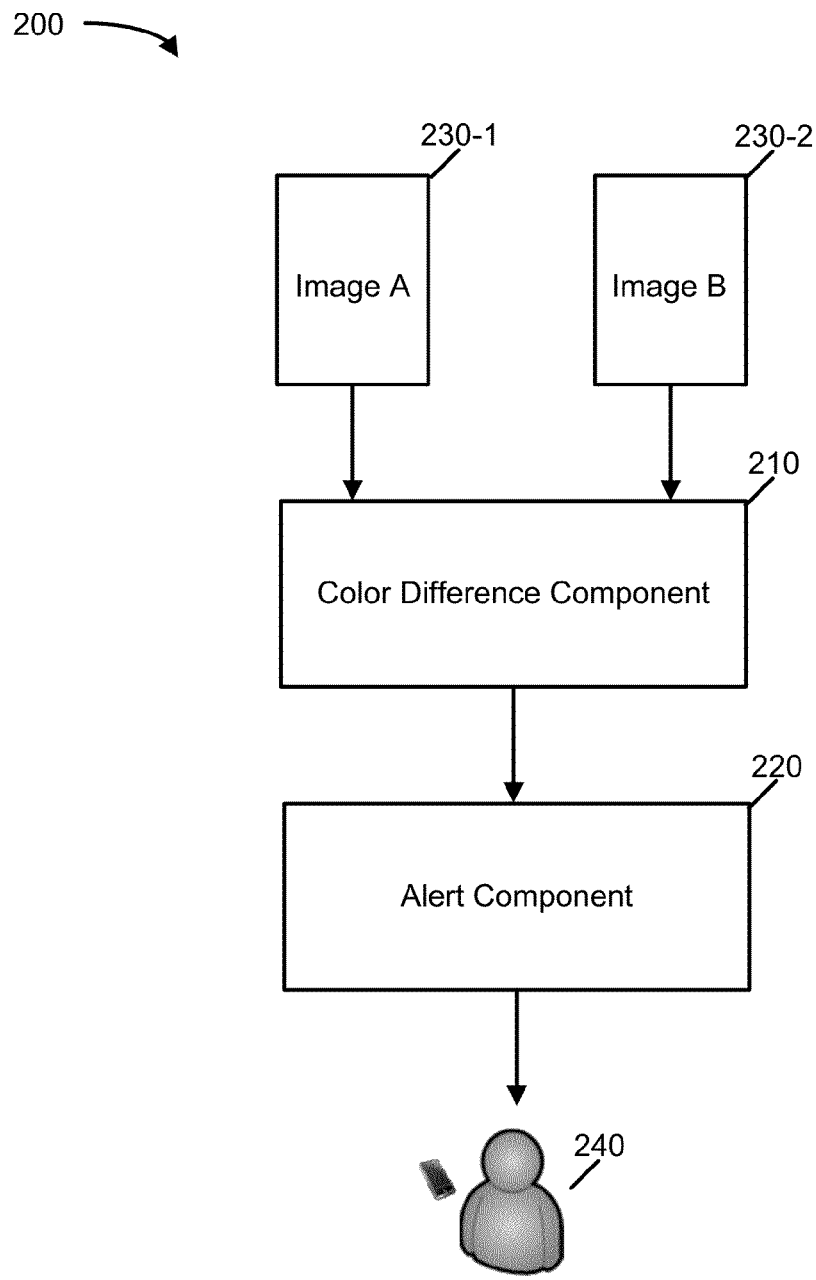
FIG. 2 is a diagram illustrating an example environment in which systems and/or methods described herein may be implemented.

FIG. 2 is a diagram illustrating an example environment 200, in which systems and/or methods described herein may be implemented. As illustrated, environment 200 may include perceptual color difference component 210 and alert component 220. Color difference component 210 may generate the color difference metric for input images 230-1 and 230-2. In some implementations, the color difference metric may be used by alert component 220 to generate alerts to indicate that the perceived color differences between images 230-1 and 230-2 are likely to be above a threshold. The alert may be received by a user 240, such as an administrator or technician. In some implementations, the alert may be automatically processed by another computing device.

Color difference component 210 may include one or more computing devices to receive images 230-1 and 230-2 and, based on the received images, calculate a value for the color difference metric. In some implementations, color difference component 210 may be implemented as a network service that provides calculation of the color difference metric for one or more user devices that may communicate with color difference component 210 over a network. Alternatively, color difference component 210 may be implemented locally relative to the application or system that uses the results of color difference component 210.

Alert component 220 may include one or more computing devices to receive the calculated color difference metrics. In one implementation, color component 220 may be configured, such as by a technician, with one or more threshold values. When the received color difference metric is above one of the threshold values, alert component 220 may output an indication (an "alert") that the perceived color differences between images 230-1 and 230-2 may be greater than the acceptable limit for the particular application. Examples of applications of the use of the color difference metric are described more detail below with reference to FIGS. 7 and 8. In some implementations, alert component 220 may be omitted, and the generated color difference metric may be directly outputted to a user or directly used by another application or system.

Images 230-1 and 230-2 may be images corresponding to the same scene. For example, as previously discussed, in one implementation, images 230-1 and 230-2 may be two images corresponding to the same point in a video that is encoded using two different encoding formats (e.g., using two different encoding resolutions). In another possible implementation, images 230-1 and 230-2 may be two images that are to be compared to determine a color similarity between the two images (e.g., as part of an image matching application). In yet another possible implementation, images 230-1 may be an image taken by a camera, in a controlled lighting environment, of the output of a display that is being tested during manufacture. In this case, image 230-2 may be a reference image that is used to test the color output of the display.

Although FIG. 2 illustrates example components of environment 200, in other implementations, environment 200 may contain fewer components, different components, differently arranged components, or additional components than those depicted. Alternatively, or additionally, one or more components of environment 200 may perform one or more other tasks described as being performed by one or more other components of environment 200.

Figure 3A:
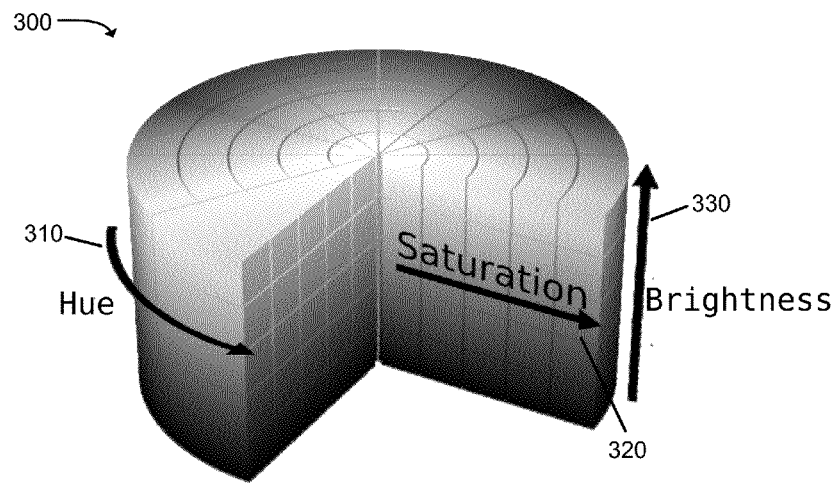
FIGS. 3A-3C are diagrams conceptually illustrating the HSB color model.
Figure 3B:
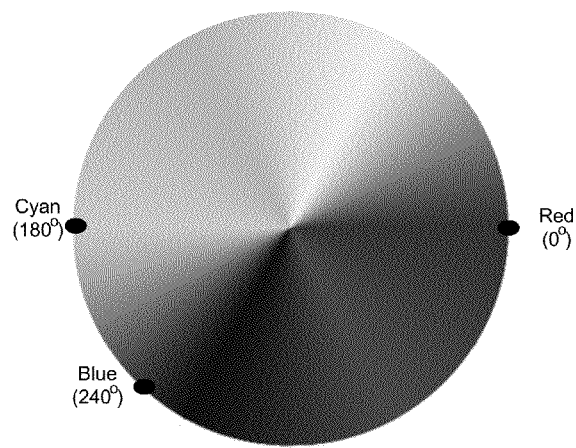
Figure 3C:
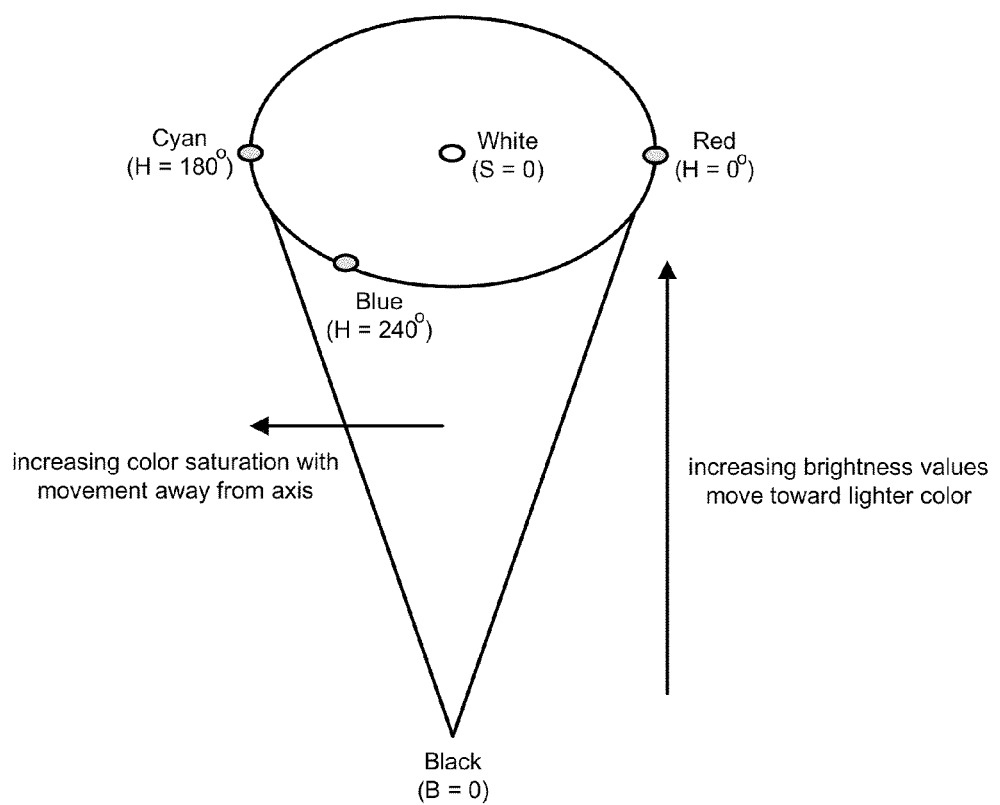

FIGS. 3A-3C are diagrams conceptually illustrating the HSB color model. FIGS. 3A-3C graphically illustrate the relationship between hue (H), saturation (S), and brightness (B) in the HSB color model.

In FIG. 3A, cylinder 300 represents possible states in the HSB color model. In cylinder 300, angle 310 around the central axis may correspond to the hue value in the HSB color model, the radial distance 320 from the central axis may correspond to the saturation in the HSB color model, and the distance 330 along the axis (the height of the cylinder) may correspond to the brightness value in the HSB color model.

FIG. 3B is a diagram illustrating a circle 340 that may correspond to a slice of cylinder 300 at a constant brightness value. As described herein, hue values in the HSB color model may be expressed in the range from zero to 360 degrees. For example, a hue value of zero degrees may correspond to red, a hue value of 180 degrees may correspond to cyan, etc. The saturation values may range from zero to one, where a saturation value of zero may correspond to no color saturation (i.e., white) and a saturation value of one may correspond to full saturation of the corresponding hue. The brightness values may range from zero to one, where a brightness value of zero may correspond to black and a brightness value of one may correspond to 100% brightness. FIG. 3C is another diagram conceptually illustrating colors in the HSB color model. In FIG. 3C, a cone, such as a cone extracted from cylinder 300, is illustrated. As shown, increasing brightness values may correlate with lighter color and increasing color saturation may correlate with movement away from the center axis.

The ranges of the hue, saturation, and brightness values illustrated in FIGS. 3A-3C are examples of possible ranges. For example, saturation and brightness could equivalently be expressed on a scale of zero to 100 instead of zero to one. Similarly, hue may be expressed on a different scale, such as zero to one.

Figure 4:
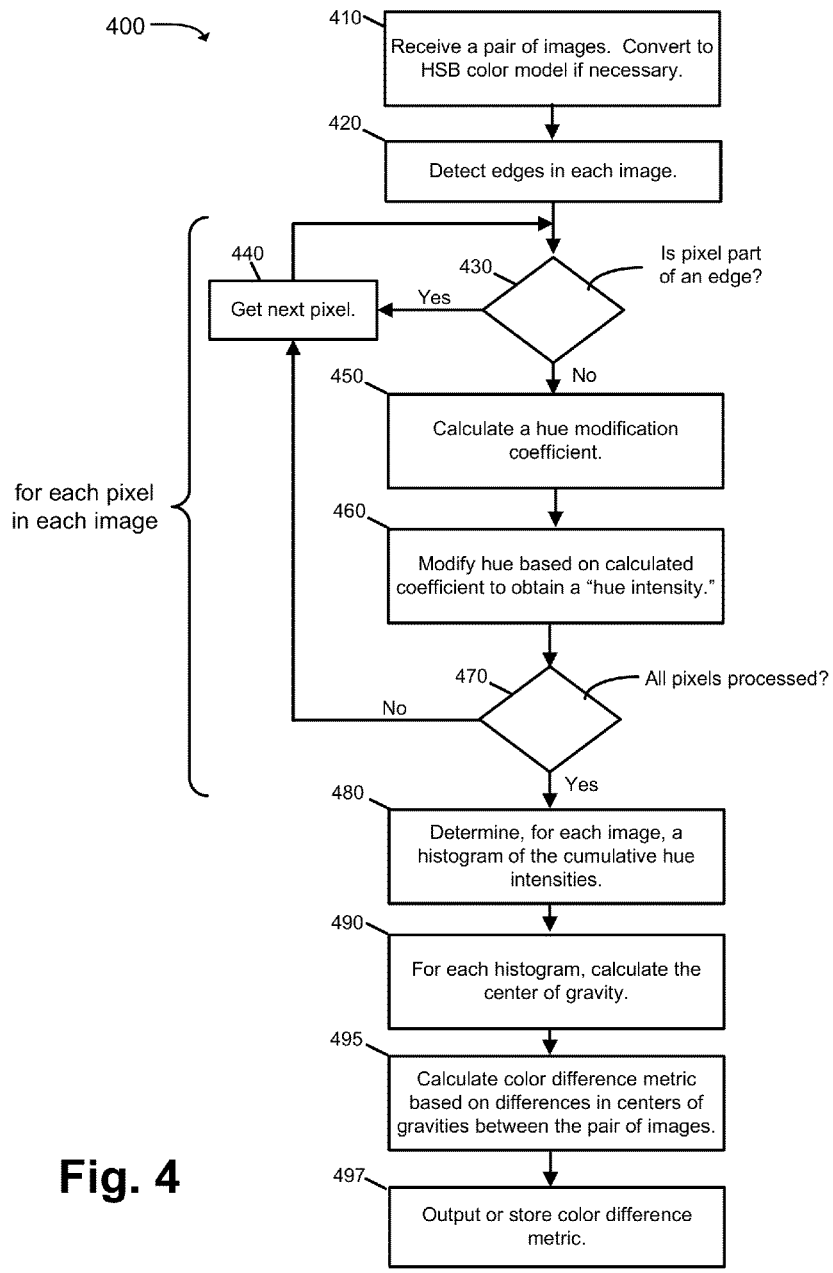
FIG. 4 is a flowchart illustrating an example process relating to determining a color difference metric for two images.

FIG. 4 is a flowchart illustrating an example process 400 relating to determining the color difference metrics for two images. Process 400 may be performed by, for example, color difference component 210.

Process 400 may include receiving a pair of images (block 410). Received images that are not in the format of the HSB color model may be converted to the HSB color model (block 410). Although the color difference metric is described herein as being calculated in terms of the HSB color model, in alternative implementations, other color models could be used.

Process 400 may include detecting edges in each of the images (block 420). Edge detection may refer to techniques for identifying points in an image at which the image brightness changes sharply or at which the image has discontinuities. A number of edge detection techniques are known. In one implementation, the Sobel edge detection technique may be used to detect edges in each of the images. In other implementations, other edge detection techniques, such as the Canny or Kayyali edge detection techniques, may be used.

Each pixel, in each edge-detected image, may be further processed in blocks 430-470. In particular, process 400 may further include determining whether a particular pixel is part of an edge (block 430). The determination of whether a pixel is part of an edge may be based on the edges detected in block 420. For example, the output of block 420 may include, for each image, an indication of whether each pixel is associated with an edge or is not associated with an edge.

Pixels that are part of an edge may not be further processed. In particular, when a pixel is part of an edge (block 430—YES), the next pixel in the image may be processed (block 440).

For each pixel that is not part of an edge (block 430—NO), process 400 may further include calculating a hue modification coefficient (block 450). The term "hue modification coefficient," as used herein, may refer to a value by which the hue value for a pixel is to be boosted or attenuated. The hue modification coefficient, for a particular pixel, may be based on the saturation and/or brightness of the pixel. In general, the hue modification coefficient may be based on the goal of increasing the impact, on the final color difference metric, for pixels that are prominent (in the sense of color) and decreasing the impact of pixels that are less prominent (e.g., pixels that appear washed out or black due to lack of brightness, over brightness, under saturated, or oversaturated).

In one implementation, the hue modification coefficient, Hc, may be determined as the product of a "saturation coefficient," Sc, and a "brightness coefficient," Bc. Thus Hc may be calculated as: Hc=Bc*Sc. Sc may be calculated as the difference between the peak possible saturation value (1.0 in the HSB color model) and the saturation value, S, of the pixel. Accordingly, Sc may be calculated as: Sc=1.0−S. Bc may be calculated as twice the distance between the brightness value, B, of the pixel, and the midrange of all possible brightness values (0.5 in the HSB color model). Accordingly, Bc may be calculated as: Bc=2*abs(B−0.5), where "abs" represents the absolute value.

Process 400 may further include modifying the hue, of the particular pixel, based on the calculated hue modification coefficient, to obtain the "hue intensity" for the pixel (block 460). Thus, the hue intensity may be calculated as: hue_intensity=H*Hc, where H represents the hue value for the pixel. As previously mentioned, in the HSB color model, the hue value may be represented as an angular portion of a circle (i.e., between zero and 360 degrees).

The above description of blocks 450 and 460 described one possible technique for assigning a hue intensity for each (non-edge) pixel in an image. The hue intensity value may be calculated with the goal of quantifying the perceptual color impact, for a viewer, of the particular pixel. In other implementations, other techniques can be used to calculate the hue intensity for the pixels in an image. For example, thresholding based on brightness and saturation may be applied, such as if threshold values for B and/or S are exceeded, the hue intensity may be calculated by decrementing or incrementing H, of the pixel, by a particular amount.

Blocks 430-470 may be repeated for each pixel in the pair of images. When all pixels have been processed (block 470—Yes), process 400 may include determining, for each image, a histogram of the cumulative hue intensities (block 480). In one implementation, the hue values for each pixel may be rounded or otherwise mapped to integer values between one and 360 (e.g., 360 degrees). The histogram, for each image, may be divided into 360 bins, each corresponding to one of the 360 possible integer hue values. The hue intensities, for each image and corresponding to a particular bin of the histogram, may be summed to obtain the cumulative hue intensity for the particular bin of the histogram. The color difference metric, as will be described with respect to blocks 490 and 495, may be calculated based on the determined histograms.

Figure 5:
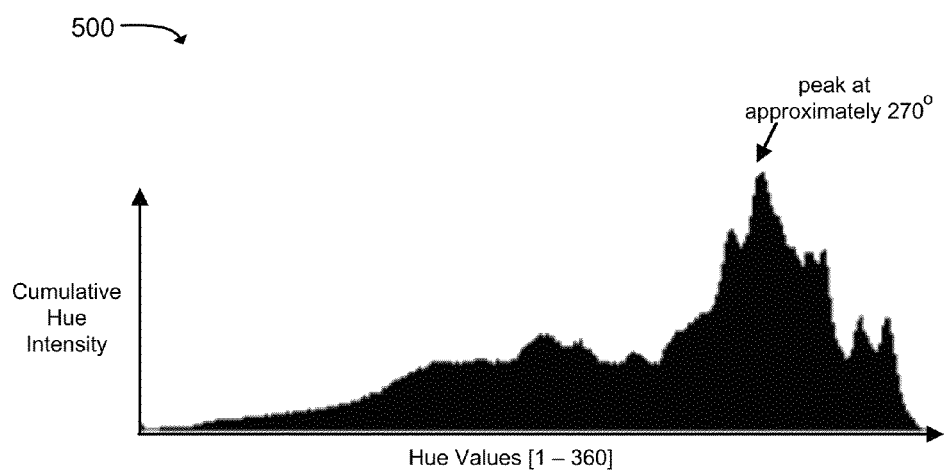
FIG. 5 is a diagram illustrating an example histogram for an image.

FIG. 5 is a diagram illustrating an example histogram 500 for an image, such as for image 230-1 or image 230-2. As illustrated, histogram 500 includes a cumulative hue intensity peak at approximately 270 degrees, which may indicate that pixels of this hue (violet) have a relatively high perceptual value in the corresponding image.

Referring back to FIG. 4, process 400 may further include, for each histogram, calculating the center of gravity of the histogram (block 490). In one implementation, the center of gravity for the histogram may be calculated based on the histogram being "wrapped" around a frictionless axis of an HSB color wheel (as illustrated in FIG. 3B). The center of gravity of the histogram may be calculated as the hue value corresponding to the angle at which the histogram aligns with an assigned direction of "gravity" (assuming the wrapped histogram is of constant density).

Figure 6A:
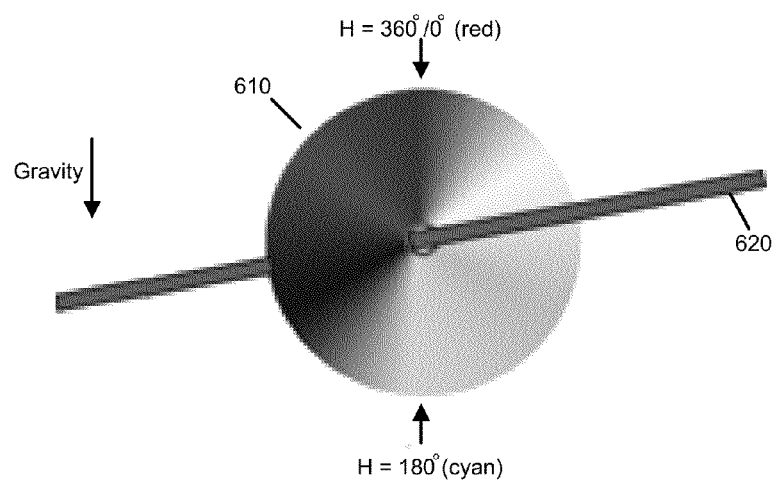
FIGS. 6A-6C are diagrams graphically illustrating an example of the center of gravity for a histogram.
Figure 6B:
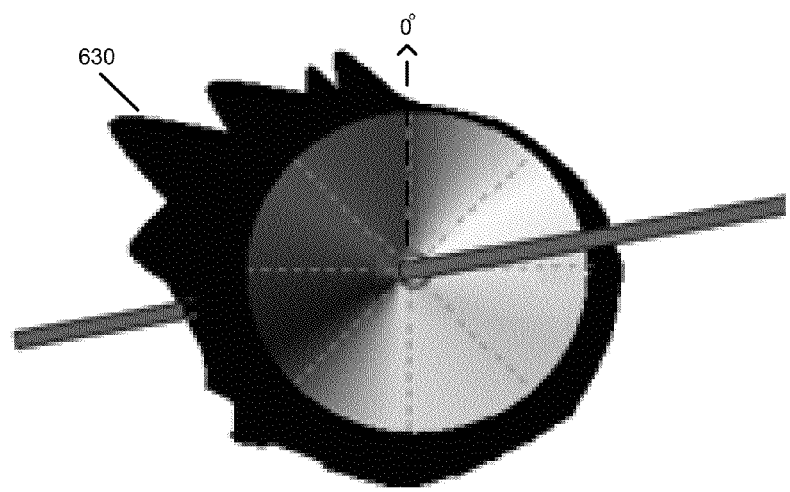
Figure 6C:
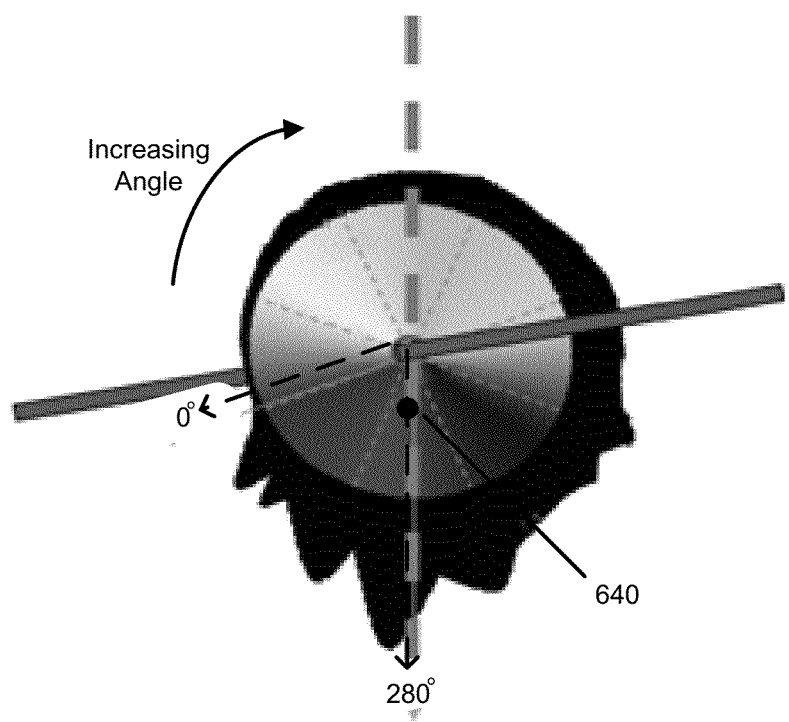

FIGS. 6A-6C are diagrams graphically illustrating an example of the center of gravity for a histogram. In FIG. 6A, an HSB color wheel 610 is illustrated. Assume that the top of the wheel corresponds to a hue value of 360 degrees (red). Wheel 610 may have an arbitrary radius (e.g., radius of one), no mass, and have a frictionless axle 620 at the center. Further, assume the direction of "gravity" to be down.

In FIG. 6B, the histogram of one of the images is illustrated as wrapped around wheel 610 to obtain wrapped wheel 630. In this example, the histogram wrapped around wheel 610 may correspond to the histogram shown in FIG. 5.

As shown in FIG. 6C, wrapped wheel 630 is conceptually illustrated as having rotated around axle 620 until wrapped wheel 630 comes to rest (due to the operation of gravity). The angle at which wrapped wheel 630 comes to rest, illustrated as approximately 280 degrees in FIG. 6C, may be determined as the center of gravity of the corresponding histogram.

In one implementation, the center of gravity for wrapped wheel 630 may be defined as the angle, with respect to axle 620, of the centroid of wrapped wheel 630. In other words, wrapped wheel 630 may be assumed to be a planar object. In this case, the centroid may be estimated as the arithmetic mean of all points in the shape defined by wrapped wheel 630.

In FIG. 6C, an example of the calculated centroid is given at point 640. The angle of point 240 with respect to axle 620 may be 280 degrees.

Referring back to FIG. 4, the color difference metric may be calculated based on differences in the centers of gravities between the pair of images (block 495). In one implementation, the color difference metric may be scaled or otherwise normalized to generate a final color difference metric for outputting. For example, the difference between the two centers of gravities, if greater than 180, may be shifted to obtain a value between zero and 180 (i.e. 180 may be subtracted from the difference between the two centers of gravities when the difference is greater than 180). This value, which will range between zero and 180, may be scaled to a percentage value between zero and 100% (e.g., by dividing by 180). As an example of the calculation of the color difference metric, assume that the centers of gravity for the two images are determined to be 280 degrees and 270 degrees. The color difference metric may be calculated as: (280−270)/180*100, which equals approximately 5.6%.

In some implementations, the shifted value between zero and 180 may be divided by a number less than 180 (e.g., 135) and the result limited to between zero and 100%. This may be useful to accommodate the situation that while 180 degrees may numerically be the maximum color separation in the HSB color model, no color on the color wheel would be described as similar to another if separated by more than a threshold amount (e.g., 135 degrees). In this example, any color separated by more than the threshold amount (e.g., 135 degrees) from another color may be considered to be perceptually different.

Process 400 may further include outputting or storing the final color difference metric (block 497). The final color difference metric may be, for example, as described previously, a value scaled to be between zero and 100%. In other implementations, the final color difference metric may be scaled or expressed in another manner.

Color difference metrics computed by color difference component 210 may be used in a number of applications. Two example applications in which color difference component 210 may be used will next be described with respect to FIGS. 7 and 8.

Figure 7:
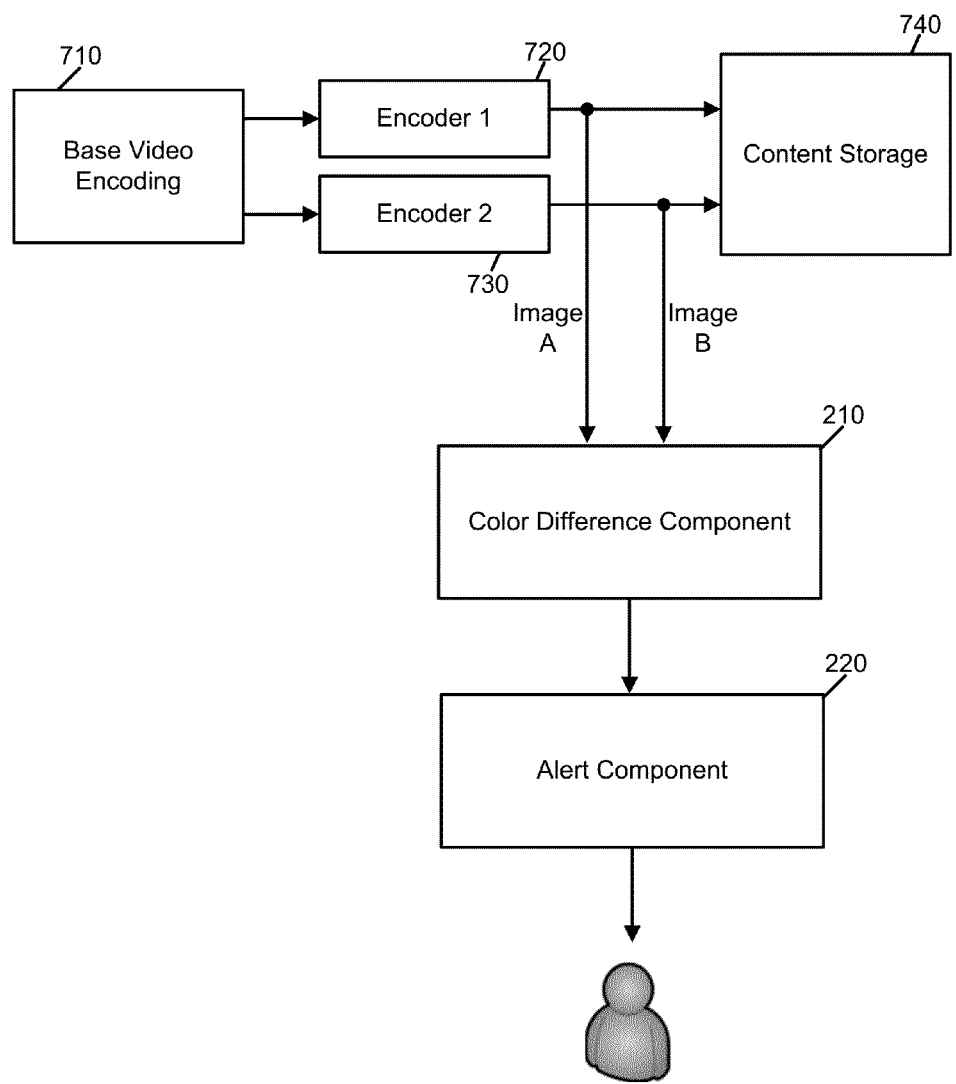
FIG. 7 is a diagram illustrating an example implementation of the use of the color difference metric in the context of encoding or transcoding videos.

FIG. 7 is a diagram illustrating an implementation of color difference component in the context of encoding or transcoding videos. In FIG. 7, assume that a video is to be encoded or transcoding into two different encoding formats. As illustrated, base video encoding 710 may represent a base encoding or raw format of the video. Base video encoding 710 may be encoded by encoders 720 ("Encoder 1") and 730 ("Encoder 2"). Encoders 720 and 730 may transcode base video encoding 710 into different encoded files based on the use of different encoding techniques and/or different parameters applied to a single encoding technique. The different encoded versions of base video encoding 710 may be stored by content storage 740. Content storage 740 may represent one or more content storage or distribution servers to distribute video to end-users.

In operation, pairs of images, corresponding to images of the same scene from the videos encoded by encoders 720 and 730, may be input to color difference component 210. Color difference component 210 may, as described above, calculate the color difference metric between the two images. The calculated color difference metric may be input to alert component 220, which, as described previously, may generate alerts or other indications, such as to a technician, when the value of the color difference metric is above a threshold.

Figure 8:
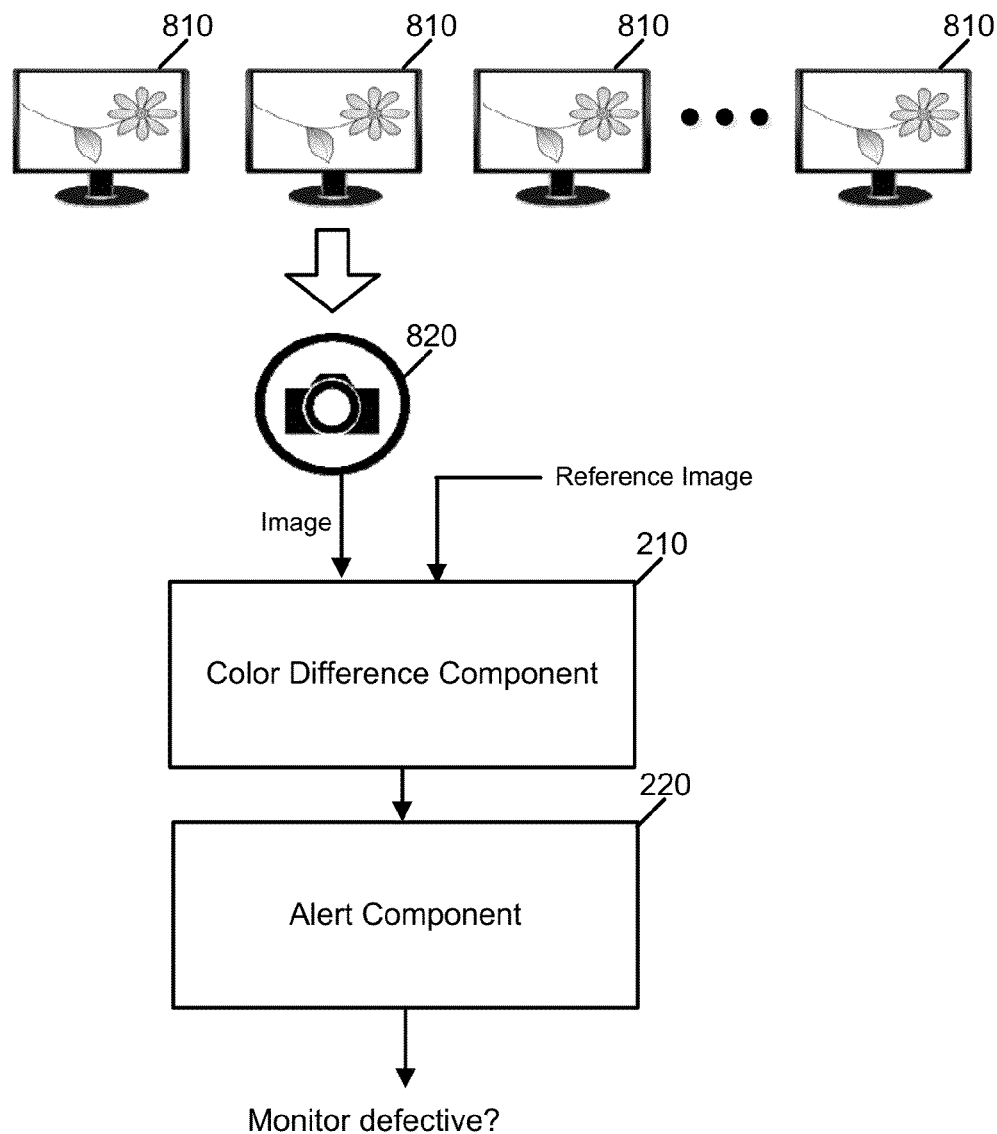
FIG. 8 is a diagram illustrating an example implementation of the use of the color difference metric in the context of the production of display devices by a manufacture.

FIG. 8 is a diagram illustrating an implementation of color difference component in the context of the production of display devices by a manufacture. The display devices may include, for example, displays for computer monitors, displays for televisions, displays for mobile phones, or other displays that may be used to display images to users. In FIG. 8, assume that displays 810 are manufactured in an assembly line and are tested to ensure uniform color presentation. As part of the test, a known image may be shown on each display. A camera 820 may take a picture of the display showing the known image. The picture may be taken in a controlled environment, such as one in which the focus of the camera the ambient lighting is controlled to be uniform for pictures on different displays 810.

The picture taken by camera 820 ("Image") may be input to color difference component 210 along with a reference image. The reference image may include an image, previously taken by camera 820, that is known to correspond to a properly working display 810. Color difference component 210 may, as described above, calculate the color difference metric between the image and the reference image. The calculated color difference metric may be input to alert component 220, which, as described previously, may generate alerts or other indications, when the value of the color difference metric is above a threshold. In this example, an alert may indicate that the corresponding monitor 810 may be defective.

It can be appreciated that the color difference metric may be used in applications other than those described with respect to FIGS. 7 and 8. For example, the color difference metric may be used in video rendering, by video rendering software developers, to ensure video is correctly reproduced on the viewing screen. As another example, the color difference metric may be used as part of automated image identification and object recognition, such as in facial recognition and "Identify Friend or Foe" (IFF) applications.

Figure 9:
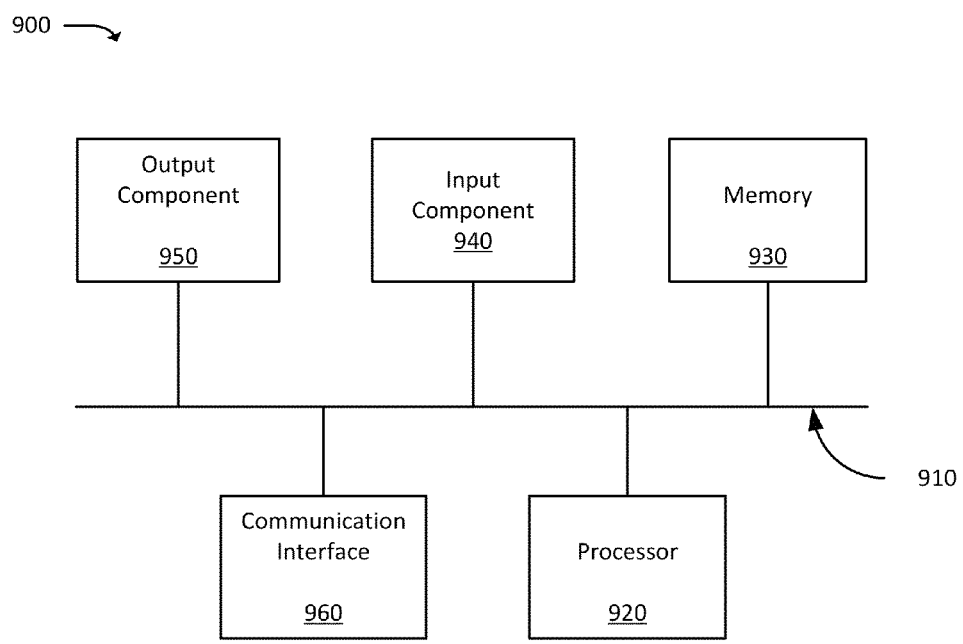
FIG. 9 is a diagram of example components of device.

FIG. 9 is a diagram of example components of device 900. One or more of the devices described above (e.g., with respect to illustrated in FIGS. 1, 2, 7, and/or 8) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 4, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold." or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method implemented by one or more devices, the method comprising:
   receiving, by the one or more devices, first and second images;
   determining, by the one or more devices, a first histogram based on hue values associated with pixels in the first image;
   determining, by the one or more devices, a second histogram based on hue values associated with pixels in the second image;
   determining, by the one or more devices, a color difference metric based on a comparison between the first and second histograms, the color difference metric relating to an objective measure of color differences between the first and second images; and
   outputting or storing, by the one or more devices, the color difference metric.

2. The method of claim 1, wherein determining the first and second histograms further includes:
   modifying the hue values associated with pixels in the first and second images based on a modification coefficient determined for each of the pixels, the modification coefficient for each of the pixels being determined based on corresponding pixel saturation and brightness values.

3. The method of claim 2, further comprising:
   determining the modification coefficient as a product of a saturation coefficient and a brightness coefficient,
      the saturation coefficient being calculated, for each of the pixels, as a difference between a peak possible saturation value and a saturation value for a particular pixel, and
      the brightness coefficient being calculated, for each of the pixels, as twice the distance between a brightness value for the particular pixel and a midrange of all possible brightness values.

4. The method of claim 1, further comprising:
   detecting edges in the first image, wherein determining the first histogram includes determining the first histogram based on pixels in the first image that are not associated with edges detected in the first image; and
   detecting edges in the second image, wherein determining the second histogram includes determining the second histogram based on pixels in the second image that are not associated with edges detected in the second image.

5. The method of claim 4, when the detection of edges in the first and second image is based on a Soble edge detection technique.

6. The method of claim 1, wherein determining the color difference metric further includes:
   calculating a first center of gravity value for the first histogram;
   calculating a second center of gravity value for the second histogram; and
   calculating the color difference metric based on the first and second center of gravity values.

7. The method of claim 1, where the first and second images are of a same scene.

8. The method of claim 1, wherein the first and second images correspond to images of a same temporal point in a video that is encoded using two different encoding techniques, the method further comprising:
   generating an alert when the output color difference output metric is above a threshold.

9. The method of claim 1, wherein the first and second images are images represented using an HSB color model.

10. A computing device comprising:
    a non-transitory computer-readable medium to store processor-executable instructions; and
    one or more processors to execute the processor-executable instructions to:
      receive first and second images;
      determine a first histogram based on hue values associated with pixels in the first image;
      determine a second histogram based on hue values associated with pixels in the second image;
      determine a color difference metric based on a comparison between the first and second histograms, the color difference metric relating to an objective measure of color differences between the first and second images; and
      output or store the color difference metric.

11. The computing device of claim 10, wherein, when determining the first and histogram, the one or more processors are to further execute the processor-executable instructions to:
    modify the hue values associated with pixels in the first and second images based on a modification coefficient determined for each of the pixels, the modification coefficient for each of the pixels being determined based on corresponding pixel saturation and brightness values.

12. The computing device of claim 10, wherein the one or more processors are to further execute the processor-executable instructions to:
    detect edges in the first image, wherein determining the first histogram includes determining the first histogram based on pixels in the first image that are not associated with edges detected in the first image; and
    detect edges in the second image, wherein determining the second histogram includes determining the second histogram based on pixels in the second image that are not associated with edges detected in the second image.

13. The computing device of claim 10, wherein, when determining the color difference metric, the one or more processors are to further execute the processor-executable instructions to:

calculate a first center of gravity value for the first histogram;

calculate a second center of gravity value for the second histogram; and calculate the color difference metric based on the first and second center of gravity values.

14. The computing device of claim 10, where the first and second images are of a same scene.

15. The computing device of claim 10, wherein the first and second images correspond to images of a same point in a video that is encoded using two different encoding techniques, wherein the one or more processors are to further execute the processor-executable instructions to:

generating an alert when the output color difference output metric is above a threshold.

16. The computing device of claim 10, wherein the first and second images are images represented using an HSB color model.

17. A method implemented by one or more devices comprising:

receiving, by the one or more devices, a first image, each pixel in the first image being associated with a hue value, a saturation value, and a brightness value;

detecting, by the one or more devices, edges in the first image;

calculating, by the one or more devices, modified hue values associated with non-edge pixels in the first image, the modified hue values, associated with the non-edge pixels in the second image, being based on corresponding pixel saturation and brightness values of the non-edge pixels in the first image;

determining, by the one or more devices, a first histogram based on a sum of the modified hue values associated with the non-edge pixels in the first image;

detecting, by the one or more devices, edges in the second image;

calculating, by the one or more devices, modified hue values associated with non-edge pixels in the second image, the modified hue values, associated with the non-edge pixels in the second image, being based on corresponding pixel saturation and brightness values of the non-edge pixels in the second image;

determining, by the one or more devices, a second histogram based on a sum of the modified hue values associated with the non-edge pixels in the second image;

determining, by the one or more devices, a color difference metric based on a comparison between the first and second histograms, the color difference metric relating to an objective measure of color differences between the first and second images; and outputting or storing, by the one or more devices, the color difference metric.

18. The method of claim 17, wherein determining the color difference metric further includes:

calculating a first center of gravity value for the first histogram;

calculating a second center of gravity value for the second histogram; and calculating the color difference metric based on the first and second center of gravity values.

19. The method of claim 17, when the detection of edges in the first and second image is based on a Soble edge detection technique.

20. The method of claim 17, further comprising:

comparing the output color difference metric to a threshold; and generating an alert when the color difference metric is greater than the threshold.

\* \* \* \* \*